United States Patent Office 3,629,288
Patented Dec. 21, 1971

3,629,288
PURIFICATION OF APROTIC SOLVENTS
Jaroslav Vit, New York, N.Y., assignor to National Patent Development Corporation, New York, N.Y.
No Drawing. Filed Nov. 6, 1969, Ser. No. 874,711
Int. Cl. C07d 7/04, 5/04
U.S. Cl. 260—345.1      10 Claims

ABSTRACT OF THE DISCLOSURE

Aprotic solvents are purified by being treated with a compound of the formula:

$$MAlH(OR)_3 \text{ or } MAlH_2(OR)_2$$

wherein M is Na and R is $R'O(CH_2)_2-$, $R'O(CH_2)_3-$, or $R'O(CH_2)_4-$, in which R' is $CH_3-$, $C_2H_5-$ or $A(CH_2)_n-$; n being 2, 3 or 4 and A being $CH_3O-$, $C_2H_5O-$,

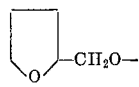

$(CH_3)_2N-$, $(C_2H_5)_2N-$ or

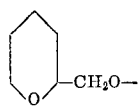

or R is $R''_2N(CH_2)_2-$, $R''_2N(CH_2)_3-$ or $R''_2N(CH_2)_4-$ in which R'' is $CH_3-$ or $C_2H_5$; or R is

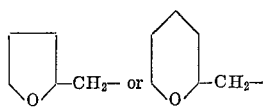

BACKGROUND OF THE INVENTION

Field of the invention

The invention relates to the purification of aprotic solvents such as ethers, hydrocarbons, certain olefins and tertiary amines.

The prior art

There are several known processes for drying, purifying, absolutizing and stabilizing aprotic solvents. In general, all of these processes which are based on chemical reactions are heterogeneous processes. All the known processes require a substantial period of time because of a logarithmically decreasing rate of reaction of the reagent used in purifying the subject material.

It is practically impossible to store really absolute aprotic solvents and for this reason they are not commercially available. The reason why such storage is not possible is that the rate of diffusion of water from a humid ambient atmosphere to the material being purified is greater than the heterogeneous drying processes.

Until now, there have been known only a few methods for achieving the above result. They are: (1) the treatment of solvents with metallic sodium; (2) treatment with calcium hydride; and (3) the use of molecular sieves.

The most widely used of these is metallic sodium in spite of its dangerous nature and the problem of waste disposal. The other two methods ($CaH_2$ and molecular sieves) are efficient enough to achieve the desired effect only when stirring of the solvent is effected. With the use of sodium wire, stirring is generally not necessary.

Regardless of which of the three processes is used, the entire drying operation requires from 1 to 3 days, thus rendering the process impractical.

Moreover, whenever purifying any solvents which have a tendency to form peroxides with oxygen (e.g., ethers and some unsaturated hydrocarbons), the use of sodium wire is extremely dangerous and the use of $CaH_2$ or molecular sieves is inefficient. This is so because before drying or distilling any of these solvents, the peroxides must be reduced by shaking the solvent with an aqueous solution of an inorganic salt in a lower valence or oxidation state such as $FeSO_4$, etc.

Thus, all of the foregoing methods are unacceptable for one reason or another.

DETAILED DESCRIPTION OF THE INVENTION

The present invention is directed to a process of purifying aprotic solvents which overcomes all of the problems encountered in the known processes.

In accordance with the present invention, the solvents to be purified are treated with at least one member of the class of reagents which will be set forth below.

The process of the present invention was developed for the dual purpose of:

(1) removing from the aprotic solvents to be purified, all protogeneous compounds such as alcohols, thiols and primary and secondary amines; and (2) reducing organic peroxides, organic acids, ketones, aldehydes and carbon dioxide dissolved in said aprotic solvents.

Among the aprotic solvents which may be purified by the present process are all ethers, hydrocarbons, certain olefins and tertiary amines.

The class of reagents to be used in performing the process are those having the following formulae:

$$MAlH(OR)_3 \text{ or } MAlH_2(OR)_2$$

wherein M is Na and R is $R'O(CH_2)_2-$, $R'O(CH_2)_3-$, or $R'O(CH_2)_4-$ in which R' is $CH_3$, $C_2H_5$, or $A(CH_2)_n$; n being 2, 3 or 4 and A being $CH_3O-$, $C_2H_5O-$,

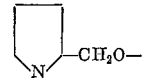

$(CH_3)_2N-$, $(C_2H_5)_2N-$ or

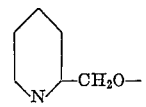

or R is $R''_2N(CH_2)_2-$, $R''_2N(CH_2)_3-$, or $$R''_2N(CH_2)_4-$$

in which R'' is $CH_3$ or $C_2H_5$; or R is

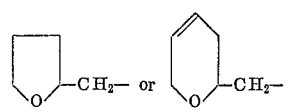

Among the above compounds, the most important and preferable for use in the process are:

$NaAlH_2[OCH_2CH_2OCH_3]_2$, $NaAlH_2[OCH_2CH_2N(CH_3)_2]_2$ and

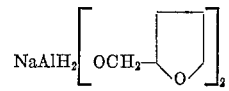

All of the above compounds are prepared according to the methods disclosed in French Pat. 1,515,582, by similar method with appropriately varied starting materials and the methods disclosed in co-pending applications Ser. Nos. 594,971; 611,845 and 626,664.

According to the invention, to purify a particular solvent, the above reagent is added to the solvent. The reagent immediately reacts with any protogeneous impurities contained therein such as water, alcohols, thiols, etc., with the formation of readily visible hydrogen bubbles. The reagent is added until the evolution of hydrogen is completed and then, an additional amount of the reagent (about 0.1 to 3% by weight) is added to stabilize the purified solvent.

The above process is almost always homogeneous with all ethers, liquid aromatic hydrocarbons, certain olefins. In those cases where it is not homogeneous, a two-phase system of two liquids is formed in which said two phases are partially miscible.

The process is heterogeneous with saturated hydro-carbons and tertiary amines. However, even when the process is heterogeneous, the reagent is soluble in both phases and the purifying process itself is always homogeneous.

The two different types of compounds included in the class of reagents, namely, $MAlH(OR)_3$ and $$MAlH_2(OR)_2$$

are in the following state of equilibrium:

$$2MAlH(OR)_3 \rightleftharpoons MAlH_2(OR)_2 + MAl(OR)_4$$

The compounds $MAl_2(OR)_2$ and $MAl(OR)_4$ are more stable than $MAlH(OR)_3$ and for this reason the latter behaves like a mixture of the two former compounds. In the following portions of this specification, all chemical reactions involving the reagent will be expressed as the reactions of the $MAlH_2(OR)_2$ and $MAl(OR)_4$.

(A) Reactions of $MAlH_2(OR)_2$

Compounds of the formula $MAlH_2(OR)_2$ react with protogeneous compounds with the evolution of hydrogen in a manner similar to that of other complex metal aluminum hydrides. The basic difference in the reaction is that compounds of the $MAlH_2(OR)_2$ type, when reacted in an excess in ethers and aromatic hydrocarbons cointaining protogeneous substances, form soluble products. When they are reacted in less than an excess, i.e., when the protogeneous substances are in an exces with respect, to $MAlH_2(OR)_2$, insoluble products are formed, which are insoluble only at high concentrations.

The evolution of hydrogen and the clarity of the solvent purified by the reagent are simple qualitative, visual and highly sensitive evidence of the degree of purity of the solvent.

The following equations illustrate the course of the reaction between $MAlH_2(OR)_2$ and various protogeneous and other impurities and show how same are removed from the solvent being purified:

(1) Reaction of $MAlH_2(OR)_2$ with $H_2O$ $$MAlH_2(OR)_2 + H_2O \rightarrow MAlO(OR)_2 + 2H_2\uparrow \quad (1)$$

$$MAlO(OR)_2 + H_2O \rightleftharpoons MAlO_2(\text{precipitate}\downarrow) + 2ROH \quad (2)$$

The product of reaction (1), i.e., $MAlO(OR)_2$, is highly soluble in ethers, very soluble in aromatic hydrocarbons and insoluble in saturated hydrocarbons. The product $MAlO_2$ is quite insoluble in all aprotic solvents; but the mixture produced by reaction (2) reacts with $MAlH_2(OR)_2$ as follows:

$$MAlO_2 + 2ROH + MAlH_2(OR)_2 \rightarrow$$
$$MAlO_2 + MAl(OR)_4 + 2H_2\uparrow \rightleftharpoons MAlO(OR)_2 \quad (3)$$

The first part of reaction (3) is very rapid and quantitative while the second part is somewhat slower and equilibrated; however, the second part is quantitative if $MAl(OR)_4$ is present in an excess.

(2) Reaction of $MAlH_2(OR)_2$ with alcohols of the formula $R'OH$ $$MAlH_2(OR)_2 + R'OH \rightarrow MAlH(OR')(OR)_2 + H_2\uparrow \quad (4)$$

$$MAlH_2(OR)_2 + 2R'OH \rightarrow MAl(OR')_2(OR)_2 + 2H_2\uparrow \quad (5)$$

Both reactions (4) and (5) are quick and quantitative even when $R'OH$ is a tertiary alcohol. The products of both reactions are soluble in ethers and aromatic hydrocarbons.

(3) Reaction of $MAlH_2(OR)_2$ with thiols of the formula $R'SH$ $$MAlH_2(OR)_2 + R'SH \rightarrow MAlH(SR')(OR)_2 + H_2\uparrow \quad (6)$$

$$MAlH_2(OR)_2 + 2R'SH \rightarrow MAl(SR')_2(OR)_2 + 2H_2\uparrow \quad (7)$$

Both reactions (6) and (7) are quick and quantitative. The solubilities of the products of both reactions in ethers and aromatic hydrocarbons are slightly lower than that of the products of reactions (4) and (5), but they are still quite sufficient.

(4) Reaction of $MAlH_2(OR)_2$ with amines of the formula $R'_2NH$ and $R'NH_2$ $$MAlH_2(OR)_2 + R'_2NH \rightarrow MAlH(NR'_2)(OR)_2 + H_2\uparrow \quad (8)$$

$$MAlH_2(OR)_2 + 2R'_2NH \rightarrow MAl(NR'_2)_2(OR)_2 + 2H_2\uparrow \quad (9)$$

$$MAlH_2(OR)_2 + R'NH_2 \rightarrow MAlH(HNR')(OR)_2 + H_2\uparrow \rightarrow MAl(NR')(OR)_2 + H_2\uparrow \quad (10)$$

Reactions (8)–(10) are quantitative and the products are readily soluble in ethers and aromatic hydrocarbons.

(5) Reaction of $MAlH_2(OR)_2$ with peroxides of the formula $R'_2O_2$ $$MAlH_2(OR)_2 + R'_2O_2 \rightarrow R'_2O + MAlO(OR)_2 + H_2\uparrow \quad (11)$$

This reaction is quantitative and the solubilities of the products are as given above with respect to water.

(6) Reaction of $MAlH_2(OR)_2$ with $CO_2$ $$3MAlH_2(OR)_2 + 2CO_2 \rightarrow MAl(OCH_3)_2(OR)_2 + 2MAlO(OR)_2 \quad (12)$$

The reaction with $CO_2$ is quick and quantitative and the products are completely soluble.

(7) Reaction of $MAlH_2(OR)_2$ with organic acids, ketones, aldehydes and their derivatives.

These substances react quantitatively with $MAlH_2(OR)_2$ to form soluble $MAl(OR')_2(OR)_2$, wherein $R'$ is the organic radical corresponding to the starting acid, ketone, aldehyde, or derivative thereof.

(B) Reaction of $MAl(OR)_4$

The complex alcoholates $MAl(OR)_4$ are completely soluble in all ethers and aromatic hydrocarbons. They react with water and alcohols as follows:

$$MAl(OR)_4 + H_2O \rightarrow MAlO(OR)_2 + 2ROH \xrightarrow{H_2O} MAlO_2 + 4ROH \quad (13)$$

$$MAl(OR)_4 + 2R'OH \rightleftharpoons MAl(OR')_2(OR)_2 + 2ROH \xrightleftharpoons[\phantom{xxx}]{2R'OH} MAl(OR')_4 + 4ROH \quad (14)$$

Neither of Reactions (13) or (14) has any substantial significance in purifying the aprotic solvents, but $$MAl(OR)_4$$

is often present in the $MAlH_x(OR)_{4-x}$ used and the above reactions are given only to show the harmless character of $MAl(OR)_4$. In the above formula, $x$ is 1 or 2.

As compared with the instantly used reagents, the metal aluminum hydrides of the formulae:

$$MAlH_4 \text{ or } M_3AlH_6$$

do not produce readily soluble products as shown in the foregoing sections (A), (1) to (7) and moreover, the solubilities of the $MAlH_4$ or $M_3AlH_6$ themselves are in no way comparable with that of $MAlH(O)_4$.

The process of the present invention is mainly applicable to the following:

(1) Homogeneous drying and purifying of ethers and aromatic hydrocarbons.

The ethers include but are not limited to $(C_2H_5)_2O$, tetrahydrofuran,

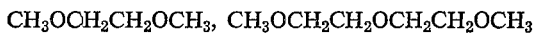

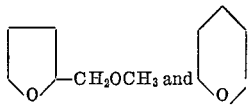

The aromatic hydrocarbons includes, but are not limited to benzene, toluene, xylenes and ethylbenzenes.

The advantages of the present process when applied to ethers and aromatic hydrocarbons are that the process is very quick, i.e., almost immediate, safe, quantitative and easily controlled, i.e., the completion of the reaction is visible to the eye. All the impurities described above in (A), (1) to (7), are removed by the process.

(2) Heterogeneous drying and purifying of olefins and alkanes.

The olefins include, but are not limited to cyclohexene, methylcyclohexene, cyclopentene and methylcyclopentene.

The alkanes include, but are not limited to the pentanes, hexanes and heptanes.

The advantages of the process when applied to olefins and alkanes are that the process is safe, quantitative and easily controlled. The reaction is quicker than known processes if a concentrated solution (e.g., about 70%) of $MAlH_n(OR)_{4-n}$ ($n=1$ or 2) is used. The previously used reagents are not soluble enough to give satisfactory results; and form precipitates immediately after mixing with the solvent. All the impurities described in (A), (1) to (7), are removed by the process.

(3) Absolute solvents stabilized by the reagents of the present invention.

Ethers and aromatic hydrocarbons containing from 0.1 to 5%, preferably from 0.5 to 1% of $MAlH_2(OR)_2$ or $MAlH(OR)_3$ are quantitatively and safely freed of all impurities described above in (A), (1 to (7). These solvents are easily and safely transportable and storable for extended periods of time without danger of contamination from the undesirable impurities.

For many of the purposes or uses to which the purified solvents are to be put, the presence of the reagent does not disadvantageously affect the solvent and may very well be left remaining therein.

If for one reason or another it is necessary to get rid of the reagent, this can be accomplished in two ways:

(1) Distilling the solvent directly into the reaction vessel in which it is to be used;

(2) Reaction of the reagent with $I_2$ or $Br_2$ directly in the solvent:

$$MAlH_2(OR)_2 + X_2 \rightarrow MAlX_2(OR)_2 + H_2\uparrow \quad (15)$$

wherein $X_2$ is $I_2$ or $Br_2$.

Reaction (15) is quantitative and quick with a visible change of the color at the end of the reaction. When the reaction is complete, the characteristic color of the halogen no longer disappears. This may be easily determined by eye with analytical accuracy. The product $$MAlX_2(OR)_2$$

is inert for partically all synthetic organic reactions. For example, when ethyl ether containing said product is used in a conventional Grignard reaction, the reaction starts immediately and proceeds with no difficulty at all.

The following is an example illustrating the use of the present process in purifying various solvents.

EXAMPLE

To 4.5 liters of any of the following solvents:
(a) ethers: $(C_2H_5)_2O$, tetrahydrofuran, $CH_3OCH_2CH_2OCH_3$, $CH_3OCH_2CH_2OCH_2CH_2OCH_3$

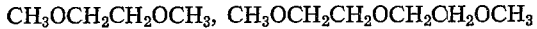

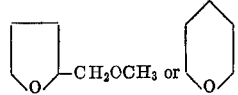

(b) aromatic hydrocarbons: benzene, toluene, xylene or ethylbenzene;

(c) olefins: cyclohexene, methylcyclohexene or methylcyclopentene, in a 5 liter bottle, there was slowly added a 70% benzene solution of $NaAlH_2(OCH_2CH_2OCH_3)_2$ or $MAlH_x(OR)_{4-x}$ where $x$ is 1 or 2. The addition was continued until the evolution of hydrogen gas bubbles ceased. Thereafter, an additional 4.5 to 135 ml. (0.1 to 3%) of the benzene solution was added to stabilize the solvent.

The purified and stabilized ethers (a) obtained by this procedure could be immediately used in Grignard reactions, reductions with complex metal hydrides, etc. These reactions started up immediately and proceeded with no trouble; and the same results were obtained after periods of storage ranging from one month to one year.

The aromatic hydrocarbons (b) obtained by this procedure were used for the Claissen and Dieckmann condensation reactions using sodium hydride as a reagent with perfect results.

The obtained solvents can be used in most cases without any additional operations because when $$NaAlH_2(OCH_2CH_2OCH_3)_2$$

was used, its molar concentration is only 0.035-0.0035 mol/liter. The same results are obtained when the $MAlH_x(OR)_{4-x}$ excess is removed by reaction with an iodine or bromine solution (1–10 mols of the halogen per liter of the same solvent as is being purified) added to the solvent in a reaction vessel prior to its use. The procedure is as follows: The halogen solution was added dropwise with stirring. When a given drop of halogen solution did not lose its characteristic color, the addition was discontinued and the solvent was immediately used in the particular synthesis mentioned above.

The same results are obtained when the solvent is distilled directly into the reaction vessel.

In addition to $NaAlH_2(OCH_2CH_2OCH_3)_2$, any of the other reagants disclosed above can be used in like manner to produce substantially similar results.

What is claimed is:

1. A process comprising contacting an aprotic solvent with a compound of the formula $$MAlH(OR)_3 \text{ or } MAlH_2(OR)_2$$

wherein M is Na and R is $R'O(CH_2)_2$—, $R'O(CH_2)_3$— or $R'O(CH_2)_4$— in which R' is $CH_3$—, $C_2H_5$— or $A(CH_2)_n$—; $n$ being 2, 3 or 4 and A being $CH_3O$—, $C_2H_5O$—,

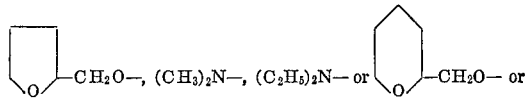

R is $R''_2N(CH_2)_2$—, $R''_2N(CH_2)_3$— or $$R''_2N(CH_2)_4$$— in which R" is $CH_3$— or $C_2H_5$; or R is

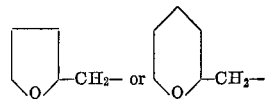

to remove from said aprotic solvent all protogeneous impurities and to reduce all organic peroxides, organic acids, ketones, aldehydes and carbon dioxide dissolved in said aprotic solvent.

2. A process as claimed in claim 1, wherein said compound is $NaAlH_2(OCH_2CH_2OCH_3)_2$, $$NaAlH_2[OCH_2CH_2N(CH_3)_2]_2$$

or

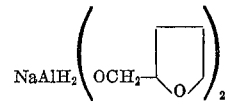

3. A process as claimed in claim 1, wherein the aprotic solvents are ethers, aromatic hydrocarbons, olefins, alkanes and tertiary amines.

4. A process as claimed in claim 1, wherein said protogeneous impurities are water, alcohols, thiols and primary and secondary amines.

5. A process as claimed in claim 3, wherein the aprotic solvents are ethers selected from the group consisting of $(C_2H_5)_2O$, tetrahydrofuran, $CH_3OCH_2CH_2OCH_3$, $CH_3OCH_2CH_2OCH_2CH_2OCH_3$,

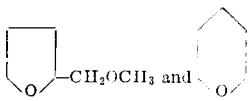

6. A process as claimed in claim 3, wherein the aprotic solvents are aromatic hydrocarbons selected from the group consisting of benzene, toluene, xylene and ethylbenzene.

7. A process as claimed in claim 1 further comprising distilling the aprotic solvent into a reaction vessel for subsequent use.

8. A process as claimed in claim 1 further comprising adding to the aprotic solvent a halogen selected from the group consisting of iodine and bromine.

9. A process as claimed in claim 1, wherein the aprotic solvent is contacted with an approximately 70% benzene solution of said compound.

10. A process as claimed in claim 1, wherein contacting is effected with said compound until hydrogen gas evolution no longer occurs and then an additional 0.1 to 3% by weight of said compound is added to the solvent.

References Cited
UNITED STATES PATENTS

| | | | |
|---|---|---|---|
| 2,576,311 | 11/1951 | Schlesinger et al. | 260—701 X |
| 3,143,542 | 8/1964 | Ziegler et al. | 260—347.8 X |
| 3,417,119 | 12/1968 | Ehrlich | 260—674 X |
| 3,479,149 | 11/1969 | Frilette | 260—701 X |

JOHN M. FORD, Primary Examiner

U.S. Cl. X.R.

252—188; 260—614 R, 615 B, 346.1 R, 674 A, 346.1 M, 674 R, 345.9, 701, 347.8, 448 AD